(12) United States Patent
Schiaffino et al.

(10) Patent No.: US 6,327,397 B1
(45) Date of Patent: Dec. 4, 2001

(54) SYSTEM AND METHOD FOR PROVIDING TEMPERATURE CONTROL FOR A THERMALLY ACTIVATED OPTICAL SWITCH USING CONSTANT TOTAL POWER

(75) Inventors: Stefano Schiaffino, Mento Park; Dale Schroeder, Scotts Valley; Mark Troll, Palo Alto, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/510,100

(22) Filed: Feb. 22, 2000

(51) Int. Cl.[7] .................................................. G02B 6/26
(52) U.S. Cl. .................................. 385/16; 385/18; 385/8
(58) Field of Search .................................. 385/16, 17, 18, 385/19–24, 40–42, 92, 37, 131, 2, 3, 8; 372/34

(56) References Cited

U.S. PATENT DOCUMENTS

| | | | |
|---|---|---|---|
| 5,699,462 | 12/1997 | Fouquet et al. | 385/18 |
| 6,055,344 | * 4/2000 | Fouquet et al. | 385/16 |
| 6,240,226 | * 5/2001 | Presby et al. | 385/42 |
| 6,246,809 | * 6/2001 | Jouanno et al. | 385/22 |

* cited by examiner

Primary Examiner—Hemang Sanghavi

(57) ABSTRACT

An optical switching device and a method of providing temperature control for the device utilize compensating thermal energy to maintain a consistent operating temperature. The optical switching device may be a thermally activated optical switch that routes optical signals using bubbles that are strategically created along optical paths within the device. The bubbles are created by thermal energy generated by switching heating elements. The compensating thermal energy may be generated by at least one compensating heating element or by at least one switching heating element that is not currently being used for optical switching, i.e., bubble creation. The compensating thermal energy is varied so that total thermal energy generated by the device is constant, which results in a consistent operating temperature. In a first embodiment, the device includes additional heating elements that are selectively activated to generate the compensating thermal energy. In a second embodiment, the compensating thermal energy is generated by all of the switching heating elements along one or more optical paths that are in a transmission mode. In a third embodiment, the device includes a single additional heating element that is supplied with a variable electrical power to generate the compensating thermal energy.

22 Claims, 7 Drawing Sheets

SYSTEM AND METHOD FOR PROVIDING TEMPERATURE CONTROL FOR A THERMALLY ACTIVATED OPTICAL SWITCH USING CONSTANT TOTAL POWER

TECHNICAL FIELD

The invention relates generally to optical switches and more particularly to a thermally activated optical switch.

BACKGROUND ART

Continuing innovations in the field of fiber optic technology have contributed to the increasing use of optical fibers in telecommunications and data communications networks. With the increased utilization of optical fibers, there is a need for efficient peripheral devices that assist in the transmission of data through these optical fibers, such as optical switches. An optical switch operates to selectively couple an optical fiber to one of two or more alternative optical fibers such that the two coupled optical fibers are in communication with each other.

The coupling of the optical fibers performed by an optical switch can be effectuated through various techniques. One technique of interest utilizes micro-mirrors to selectively route optical signals from an input optical fiber to a selected output optical fiber. In the simplest implementation of the micro-mirror technique, the input optical fiber is aligned with one of two output optical fibers, such that when the micro-mirror is not placed in the optical path between these two aligned optical fibers, the two aligned optical fibers are in a communicating state. However, when the micro-mirror is interposed between the two aligned optical fibers, the micro-mirror steers, i.e., reflects, the optical signals from the input optical fiber to the other output optical fiber. The positioning of the micro-mirror in and out of the optical path between the two aligned optical fibers can be accomplished by using a micro-machined actuator that mechanically displaces the micro-mirror to a desired position.

Another technique of interest utilizes thermally created bubbles, instead of micro-mirrors, to selectively route optical signals from input fibers to target output optical fibers. This technique is implemented in a thermally activated optical switch that is described in U.S. Pat. No. 5,699,462 to Fouquet et al., which is assigned to the assignee of the present invention. A conventional thermally activated optical switch 10 is schematically illustrated in FIGS. 1 and 2. As shown in FIG. 1, the optical switch includes a waveguide chip 12, a heater chip 14, and a metal substrate 16. The waveguide chip contains planar waveguides 18, shown in FIG. 2, that serve as media for transmission of optical signals. These waveguides form a matrix of optical paths. Optical paths 20, 22, 24 and 26 facilitate lateral transmissions of optical signals, while optical paths 28, 30, 32 and 34 facilitate vertical transmissions of optical signals. The waveguide chip also contains a number of trenches 36, located at intersections of optical paths. Each trench is positioned so that an incoming optical signal from one of the optical paths 20–26 will impinge upon the trench at an angle of incidence greater than the critical angle of total internal reflection (TIR). When a trench is filled with a liquid having a refractive index generally matching that of the waveguides, optical signals propagating along the lateral optical path that extends across that trench will be transmitted through that trench. However, when a bubble is formed within the trench, the optical signals are reflected by the wall of the trench from the lateral optical path to a vertical optical path that intersects the lateral optical path at the location of the trench.

The heater chip 14 of the optical switch 10 includes heating elements 38, i.e., resistors, and other electrical elements, such as transistors, to address individual resistors. For simplification, only the resistors are shown in FIG. 2. The heater chip is aligned with the waveguide chip 12 so that each resistor of the heater chip is positioned below a trench 36 of the waveguide chip, where two optical paths intersect. The resistors provide the thermal energy to create the bubbles within the trenches. Therefore, by selectively activating the resistors, any optical signals that were originally propagating through the lateral optical paths 20–26 can be rerouted to the vertical optical paths 28–34. The heater chip is attached to the metal substrate 16 of the optical switch, as shown in FIG. 1. The metal substrate contains a reservoir 40 of the refractive index-matching liquid. The reservoir is connected to the trenches of the waveguide chip by vias (not shown), which extend through the heater chip.

In order to provide an optimized and consistent performance of the thermally activated optical switch 10, the heater chip 14 needs to be maintained at nearly constant and uniform temperature. Large temperature variations at the intersections of optical paths, or cross points, where the bubbles are created to reflect optical signals, cause increased optical losses and cross talk, as well as perturbations to the bubble behavior. Environmental changes aside, accurate and precise temperature control of an NxN thermally activated optical switch, where N is significantly large, is difficult because N resistors can be activated simultaneously. Therefore, the total heat load of the heater chip can change by as much as N times the power required at each cross point, which results in large temperature variations.

An active temperature control device 42, shown in FIG. 1, can be utilized to try to control the temperature fluctuations within the optical switch 10. However, for packaging reasons, the temperature control device is located at a significant distance from the heater chip 14, where the sudden heat load changes are generated. As shown in FIG. 1, the temperature control device is located below the optical switch. Thus, the temperature control device and the heater chip are separated by the metal substrate 16. This implies that (i) a thermal gradient will exist between the heater chip and the temperature control device and (ii) any change in the local temperature of the switch will be resolved on a time scale limited by the heat conduction between the heat generating resistors and the active temperature control device. The amplitude of the temperature fluctuations depends both on the power required for each resistor and on the thermal resistance of the path between the heat generating resistors and the temperature control device. Therefore, if the materials along the heat path have a low thermal diffusivity, the temperature control device will have a slow response time. It follows that on-chip temperature control will benefit from reducing the power requirements of the resistors and from devising packaging solutions that maximize the heat transfer between regions of heat production and heat removal.

Although the above approaches will result in an improved on-chip temperature control for a thermally activated optical switch, additional improvement in temperature control is desired. Therefore, what is needed is a thermally activated optical switching device and a method for improving the temperature control of the switching device.

SUMMARY OF THE INVENTION

An optical switching device and a method of providing temperature control for the device utilize compensating thermal energy to maintain a consistent operating temperature. The optical switching device may be a thermally activated optical switch that routes optical signals using bubbles that are strategically created or manipulated along optical paths within the device.

The bubbles are created by thermal energy generated by switching heating elements. The compensating thermal energy may be generated by at least one compensating heating element or by at least one switching heating element that is not currently being used for optical switching, i.e., bubble creation. The compensating thermal energy is varied so that total thermal energy generated by the device is constant, which results in a consistent operating temperature.

The device includes a waveguide chip, a heater chip, a metal substrate and a control unit. The waveguide chip includes a number of waveguides that define intersecting optical paths. Thus, the device may be an N×M optical switching device, where N input optical paths intersect M output optical paths. The waveguide chip also includes trenches in which the bubbles are created. Each trench is positioned at an optical path intersection, so that optical signals along an input optical path are reflected to an output optical path at the intersection when a bubble is present in the trench. The waveguide chip may be composed of silica. The heater chip includes a number of switching heating elements, e.g., switching resistors, and may include one or more compensating heating elements, e.g., compensating resistors. These switching and compensating resistors are controlled by the control unit. The control unit includes circuitry to selectively supply electrical power to these resistors. The heater chip also includes fluid fill-holes that extend through the heater chip. These fluid fill-holes supply the refractive index-matching liquid to the trenches from a reservoir in the metal substrate.

In a first embodiment, the heater chip includes N×M switching resistors. The heater chip also includes additional N resistors that function as compensating resistors. The compensating resistors are distributed throughout the heater chip to diffuse the source of heat generation and to reduce the likelihood of localized temperature gradients. In this embodiment, the control unit is configured to consistently activate N switching and/or compensating resistors, regardless of the optical switching configuration of the device. The compensating resistors generate the variable compensating thermal energy, so that the total thermal energy generated by the device remains constant for different switching configurations.

In operation, X ($0 \leq X \leq N$) switching resistors are selectively activated by the control unit to create bubbles in the trenches at which reflection is required for the current optical switching configuration. If X equals N, the thermal energy generated by the activated switching resistors is the desired total thermal energy. In this case, no compensating resistor needs to be activated. However, if X is less than N, the thermal energy generated by the activated resistors is less than the desired thermal energy. In this case, the control unit activates N−X number of compensating resistors, using the same electrical power delivered to each switching resistor for each compensating resistor. That is, for each column of switching resistors where no switching resistor is activated, a compensating resistor is instead activated. Since N resistors are activated for any optical switching configuration, the total thermal energy generated by the device is constant. Therefore, the operating temperature of the device will be more accurately and easily controlled. The total electrical power supplied to the switching resistors and/or the compensating resistors is the same for each optical switching configuration.

In a second embodiment, the heater chip still includes N×M switching resistors, but does not include any compensating resistors. In this embodiment, the compensating thermal energy is generated by the switching resistors along each column in which no switching resistor is activated for optical switching. For each of these columns, the electrical power required for switching conditions is distributed to each resistor along the column. Thus, the cumulative thermal energy generated by the resistors on one of these columns would equal the thermal energy generated by a single activated resistor. At the same time, if N is sufficiently large, the power generated at each resistor will be small and below the minimum threshold to thermally activate a bubble. Consequently, the total thermal energy generated by the device is maintained at a constant value for different switching configurations, which equates to a consistent operating temperature. Again, the total electrical power supplied to the switching resistors remains the same for each optical switching configuration.

In a third embodiment, the heater chip includes N×M switching resistors and a single large compensating resistor. In this embodiment, the control unit is configured to supply the compensating resistor with a variable electrical power to generate the compensating thermal energy. The amount of electrical power supplied to the compensating resistor would depend on the number of activated switching resistors for the current optical switching configuration, which determines the thermal energy generated by the activated switching resistors. Thus, the total thermal energy generated by the device will remain constant for different switching configurations, which provides the consistent operating temperature.

DETAILED DESCRIPTION

Figure 1:
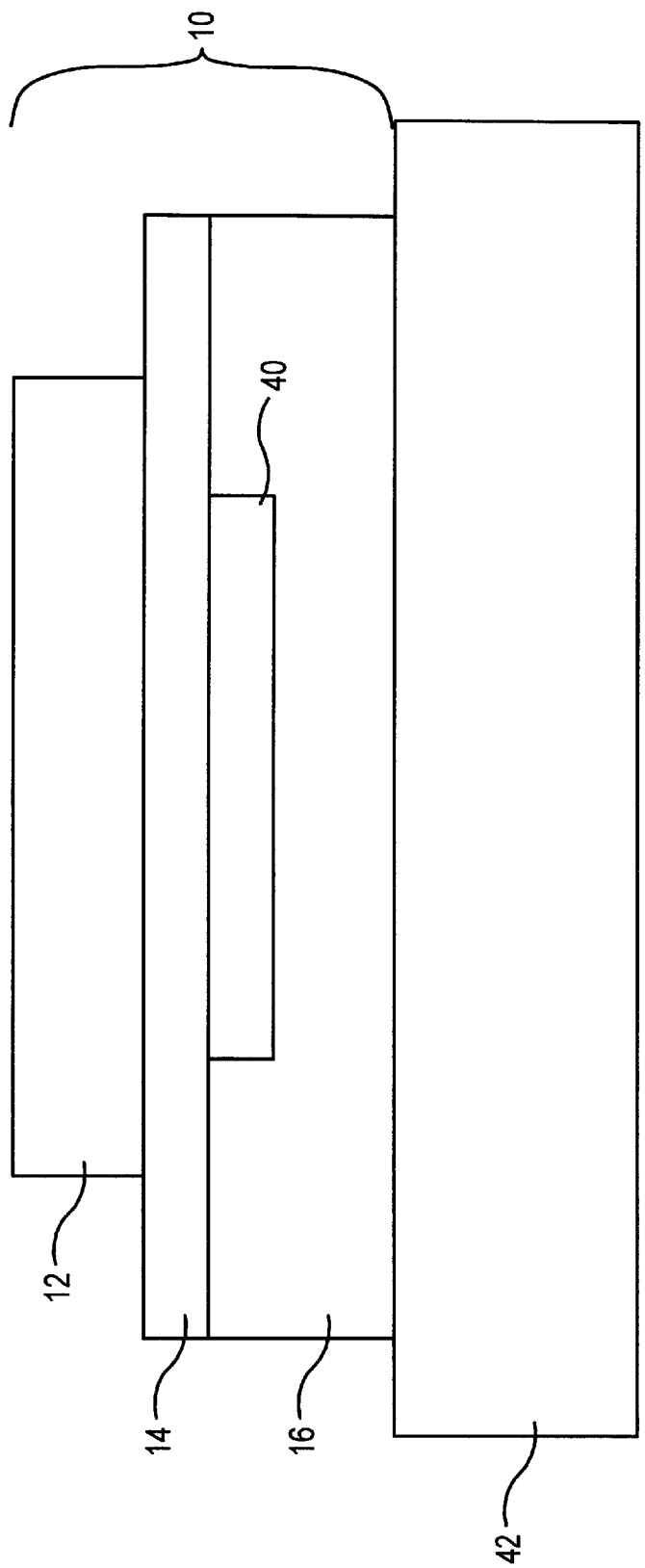
FIG. 1 is a cross-sectional view of a thermally activated optical switch in accordance with a prior art.
Figure 2:
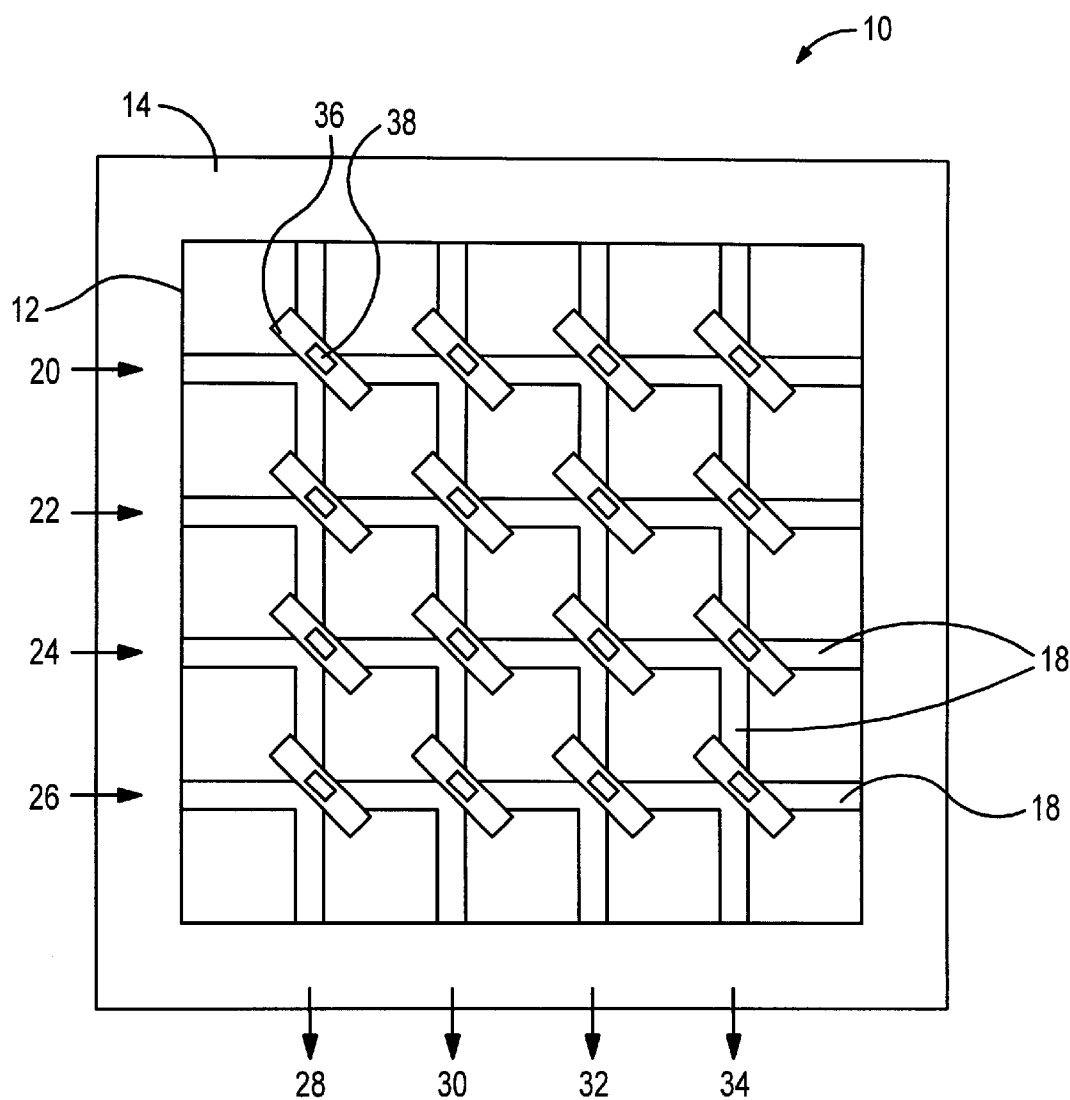
FIG. 2 is a top view of the optical switch of FIG. 1.

Short term temperature fluctuations within a thermally activated optical switch, such as the optical switch of FIG. 1, are primarily due to the activation and deactivation of heating elements to form bubbles for selective routing of optical signals, where the number of activated heating elements can vary substantially during operation. For an N×M optical switch, the number of heating elements that may be activated for a given moment can be 0 to N, depending on the current optical coupling configuration of the switch. N is the typical maximum number of heating elements that are activated for a given moment, since only one heating element needs to be activated for each column of heating elements that corresponds to an input optical path of the switch. The total amount of thermal energy generated within the optical switch by the activated heating elements for a given moment depends on the number of activated heating elements times the power required by each heating element to create a bubble.

The fundamental idea of the present invention is to operate a thermally activated optical switch at a constant thermal power, i.e., a fixed electrical power, so that the optical switch can be maintained at a substantially consistent operating temperature. For an N×M optical switch, this fixed electrical power would be N times the required power for activating a heating element. Since most of the optical coupling configurations of the switch would require the activation of fewer than N heating elements, the amount of electrical power used by these heating elements would be less than the fixed electrical power. Consequently, the thermal energy generated by the activated heating elements would yield an operating temperature for the optical chip that is less than the desired temperature. However, the desired operating temperature can be achieved by distributing the remaining electrical power, i.e., the fixed electrical power minus the power used by the activated heating elements, to those heating elements that are not being activated and/or other heat-producing elements to generate a compensating thermal energy. The compensating thermal energy will then raise the temperature of the switch to that of the desired operating temperature. In this manner, the optical switch can be maintained at a consistent operating temperature. Described below are three embodiments of the invention that utilize this idea of generating a compensating thermal energy to maintain the consistent operating temperature.

Figure 3:
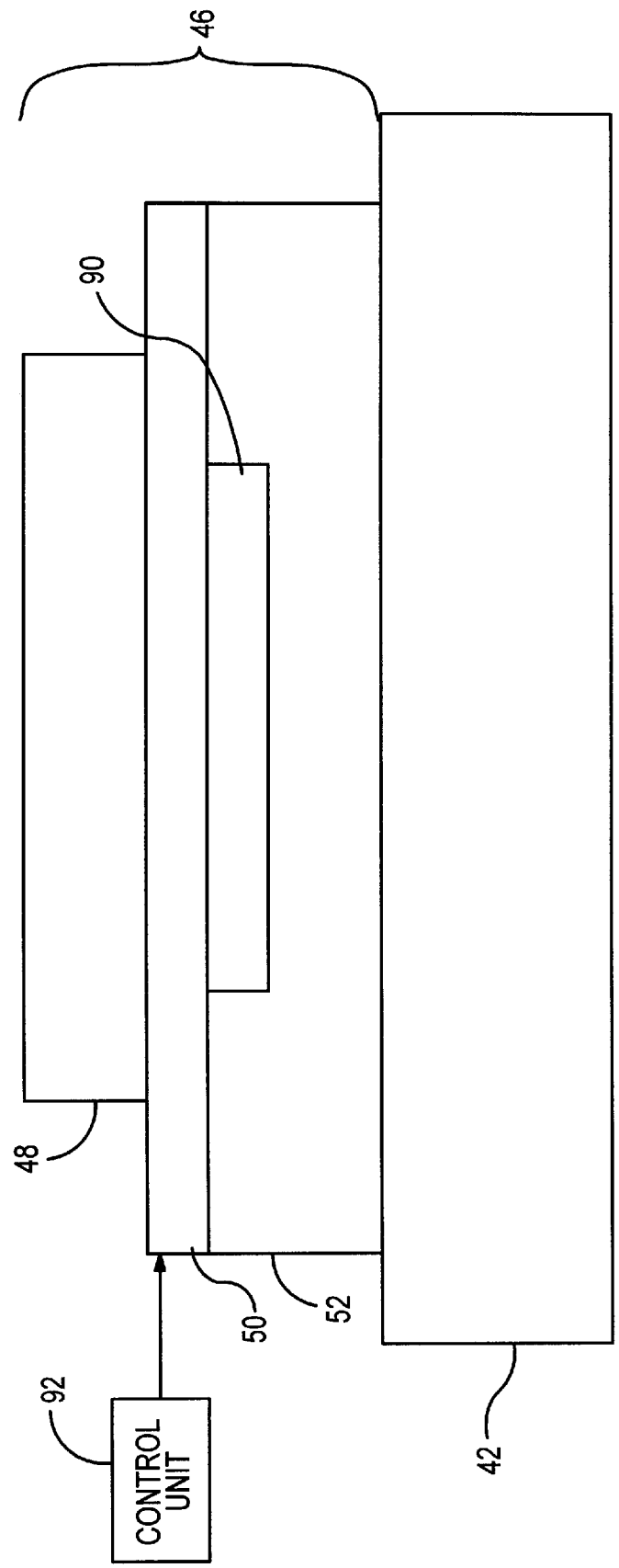
FIG. 3 is a cross-sectional view of a thermally activated optical switch in accordance with a first embodiment of the present invention.
Figure 4:
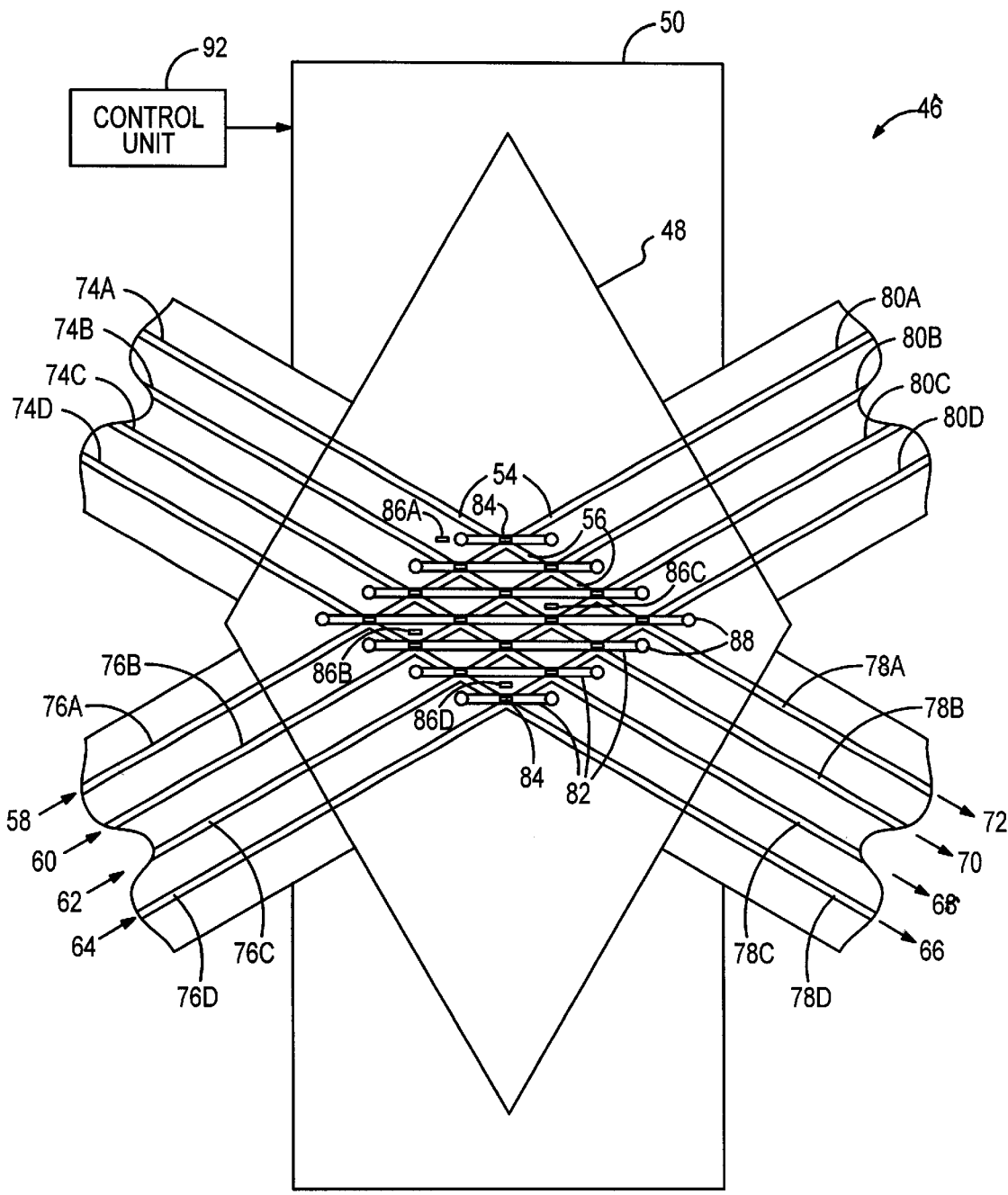
FIG. 4 is a top view of the thermally activated optical switch of FIG. 3.

With reference to FIGS. 3, and 4, a thermally activated optical switch 46 in accordance with a first embodiment of the invention is shown. The optical switch includes a waveguide chip 48, a heater chip 50, and a metal substrate 52. The waveguide chip is preferably made of silica. The waveguide chip contains sixteen planar waveguides 54 and twenty-four intermediate waveguides 56 that define intersecting optical paths 58, 60, 62, 64, 66, 68, 70 and 72, as illustrated in FIG. 4. Although the optical switch is shown as a 4×4 switch, the optical switch may be configured as an N×M switch, where N and M are integers. The optical switch is attached to four sets of optical fibers 74, 76, 78 and 80, with each set including four optical fibers. Typically, the operations of the optical switch that are of greatest concern are the operations that determine the optical coupling of the optical fibers 76A, 76B, 76C and 76D with the optical fibers 78A, 78B, 78C and 78D. The remaining optical fibers may be used for add and drop operations or to connect to other switches to form a larger switching matrix. The waveguide chip also contains trenches 82 that can be filled with the refractive index-matching liquid and that enable the formation of a bubble at each intersection of optical paths. As previously described with reference to FIG. 1, the optical coupling of the waveguides depends on the presence of the refractive index-matching liquid or a bubble at a waveguide intersection.

The heater chip 50 of the optical switch 46 includes sixteen switching heating elements 84 and four compensating heating elements 86 that are formed on a substrate, which may be made of silicon. Both types of heating elements are resistors that are designed so that each resistor generates the same amount of thermal energy when activated by a predefined voltage or current. The switching resistors are used to create bubbles within the trenches 82 of the waveguide chip 48, while the compensating resistors are used to generate a variable compensating thermal energy to maintain the consistent operating temperature. The manner in which the compensating resistors are utilized for temperature control will be described below. As illustrated in FIG. 4, each switching heating element 84 is aligned with an optical path intersection, so that a bubble can be formed in the trench at that intersection. The compensating resistors 86 are positioned at various locations throughout the heater chip. The exact locations of the compensating resistors are not critical to the invention, but preferably promote uniform heat distribution. The compensating resistors are shown FIG. 4 to illustrate one possible distribution of the compensating resistors on the heater chip 50. The heater chip further includes electrical traces (not shown) and other electrical components (not shown), such as transistors, that allow selective activation of the switching and compensating resistors. The heater chip also includes a number of fluid feed-holes 88 that extend completely through the heater chip. These fluid feed-holes supply the refractive index-matching liquid to the trenches of the waveguide chip from a reservoir 90 of refractive index-matching liquid, which is located in the metal substrate 52.

The electrical components of the heater chip 50, including the switching and compensating resistors 84 and 86, are connected to a control unit 92. The control unit includes circuitry to drive the electrical components of the heater chip. The control unit may be an off-chip unit that is connected to the heater chip by electrical leads. However, the control unit may be partially or completely fabricated on the heater chip. The control unit operates to selectively activate one or more switching resistors 84, so that the optical switch 46 is in a particular switching configuration. In addition, the control unit selectively activates one or more compensating resistors 86, depending on the number of switching resistors that are activated.

The metal substrate 52 of the optical switch 46 includes the reservoir 90 of index-matching liquid. Preferably, the metal substrate is made of a material that has a high thermal diffusivity, so that the active temperature control device 42 can regulate the temperature of the optical switch. The temperature control device may be a solid state thermoelectric converter. The temperature control device is thermally coupled to the optical switch 46.

In operation, X switching resistors 84 are activated by the control unit 92 to create bubbles in selected trenches in accordance with a current switching configuration of the optical switch. The activation of a switching resistor involves supplying a predefined amount of electrical power, P, to generate a bubble within a trench aligned with that switching resistor. For the optical switch 46 of FIGS. 3 and 4, X is an integer from zero to four, since the optical switch can selectively route optical signals from the four input optical fibers 76A, 76B, 76C and 76D to the output optical fibers 78A, 78B, 78C and 78D. If X equals N, the compensating resistors 86 are not activated. However, if X is less than N, N–X compensating resistors are also activated by the control unit 92. Therefore, the number of switching resistors and compensating resistors that are activated is N, regardless of the switching configuration of the switch 46. For a subsequent switching configuration of the switch, the number of switching resistors and the number of compensating resistors that are activated may each change, but the total number of activated resistors, switching and/or compensating, remains the same. Since the total number of activated resistors is the same for different configurations, the total thermal energy generated by the activated resistors is substantially the same for every possible switching configuration. Consequently, the total electrical power supplied to the switching and/or resistors is constant. Thus, the operating temperature of the optical switch can be maintained at a consistent temperature.

When one or more compensating resistors 86A, 86B, 86C and 86D are activated to generate the compensating thermal energy, the selected compensating resistors should be those that are in close proximity to the optical paths that are in a transmission mode. That is, compensating resistors are activated near one or more input optical paths 58, 60, 62 and 64 for which no switching resistor 84 is activated, so that optical signals are transmitted to fibers 80A, 80B, 80C and 80D without being reflected by a bubble. In contrast, if the optical path 58, 60, 62 or 64 is in a reflection mode, one of the switching resistors along that optical path is activated to create a bubble to reflect the optical signals on that input optical path to one of the output optical paths 66, 68, 70 and 72. As an example, the compensating resistor 86A may be fired when the optical path 58 is in the transmission mode. Similarly, the compensating resistors 86B, 86C and 86D may be individually fired when the optical paths 60, 62 or 64, respectively, are in the transmission mode. In this manner, the compensating thermal energy generated by the compensating resistors is distributed on the heater chip 50 to reduce the likelihood of creating a localized heat spot on the waveguide chip 48.

Figure 5:
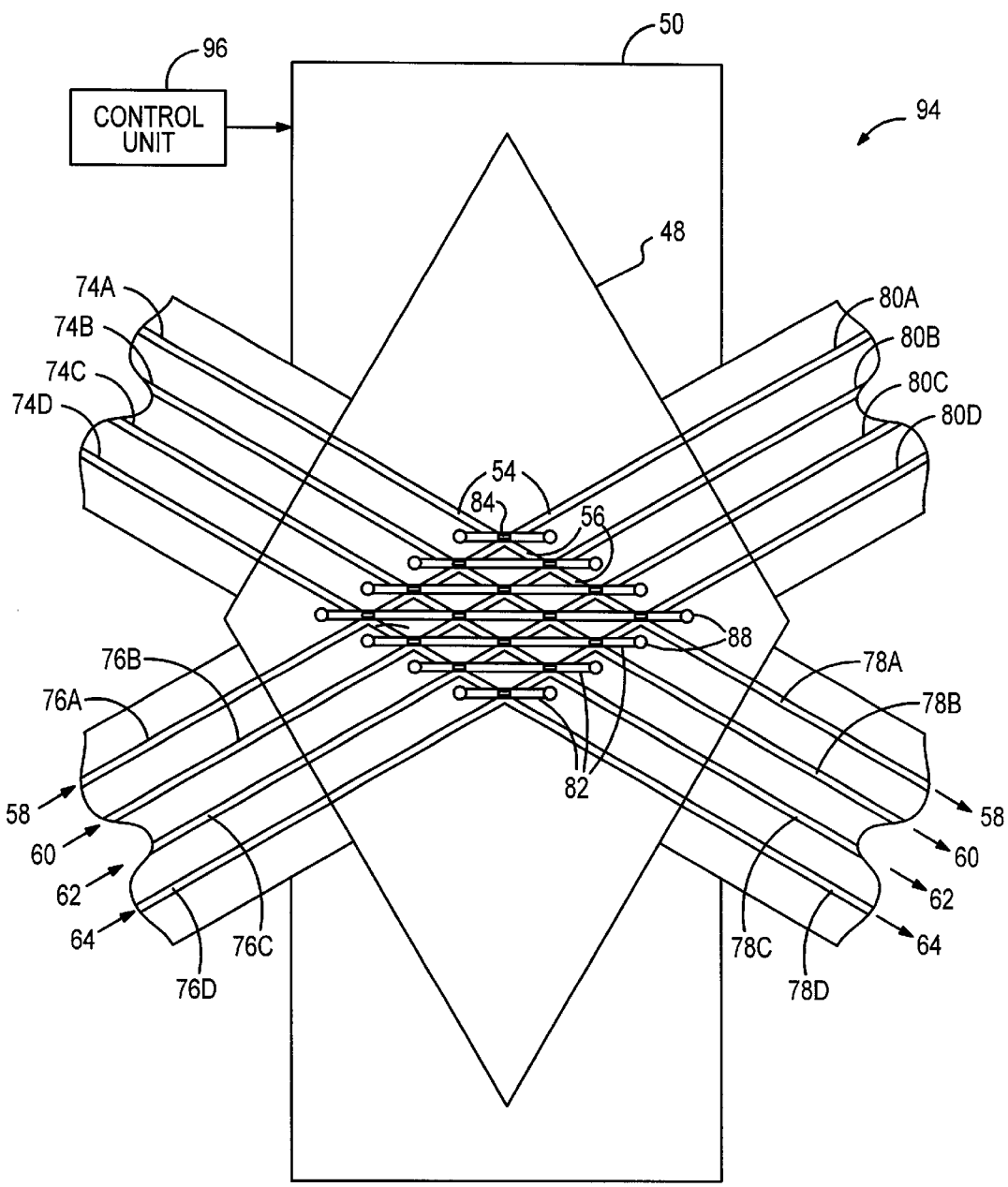
FIG. 5 is a top view of a thermally activated optical switch in accordance with a second embodiment of the invention.

Turning to FIG. 5, a thermally activated optical switch 94 in accordance with a second embodiment of the invention is shown. The thermally activated optical switch 94 includes all of the components of the thermally activated optical switch 46 of FIGS. 3 and 4, excluding the compensating resistors 86A, 86B, 86C and 86D. In addition, the optical switch 94 includes a control unit 96 that replaces the control unit 92 of the optical switch 46. The control unit 96 is similar to the control unit 94. However, the control unit 96 is configured to use some of the switching resistors 84 that are not being activated for a switching function to generate the compensating thermal energy. The operation of the control unit 94 will be further described below. The compensating thermal energy and the thermal energy generated by the activated resistors result in the desired total thermal energy for maintaining the consistent operating temperature of the optical switch 94.

In operation, X switching resistors 84 are selectively activated, if necessary, by the control unit 96 to create bubbles in the trenches that are aligned with the activated resistors for the current optical coupling configuration of the optical switch. If X equals N (the number of input optical fibers, e.g., 76A, 76B, 76C and 76D, attached to the optical switch 94), the thermal energy generated by the activated switching resistors is the desired total thermal energy. Thus, there is no need to generate any compensating thermal energy in this switching configuration. However, if X is less than N, there are one or more input optical paths 58, 60, 62 and 64 that are in the transmission mode. For each of these optical paths, the control unit 96 distributes the power P among all of the switching resistors along that optical path. As stated above, P is the predefined amount of electrical power that is supplied to a single switching resistor 84 to generate a bubble within a corresponding trench 82. The control unit may be configured to simultaneously apply power equal to P/M to each switching resistor on an input optical path that is in the transmission mode. Alternatively, the control unit may be configured to cycle the electrical power P through each switching resistor on that input optical path by sequentially addressing the resistors. Since each switching resistor will be supplied with an electrical power less than the power P, these switching resistors will not generate enough thermal energy to create bubbles. Thus, the transmission mode of the optical path will not be compromised.

In any switching configuration, the total electrical power supplied to the switching resistors 84 of the optical switch 94 is the power P times N. If all of the input optical paths 58, 60, 62 and 64 are in the reflection mode, N switching resistors will be activated, one for each optical path. Thus, the total electrical power supplied to the activated resistors will be P×N. However, if one or more optical paths are in the transmission mode, the power P is distributed among all of the resistors along those optical paths. Consequently, the total electrical power supplied to the switching resistors still remains P×N. As a result, the total thermal energy generated within the optical switch 94 is fixed, regardless of the switching configuration of the optical switch. When the switching configuration changes, the total thermal energy generated for that configuration will be the same as the previous configuration. Therefore, the operating temperature of the optical switch, which depends on the generated thermal energy, will remain consistent.

Figure 6:
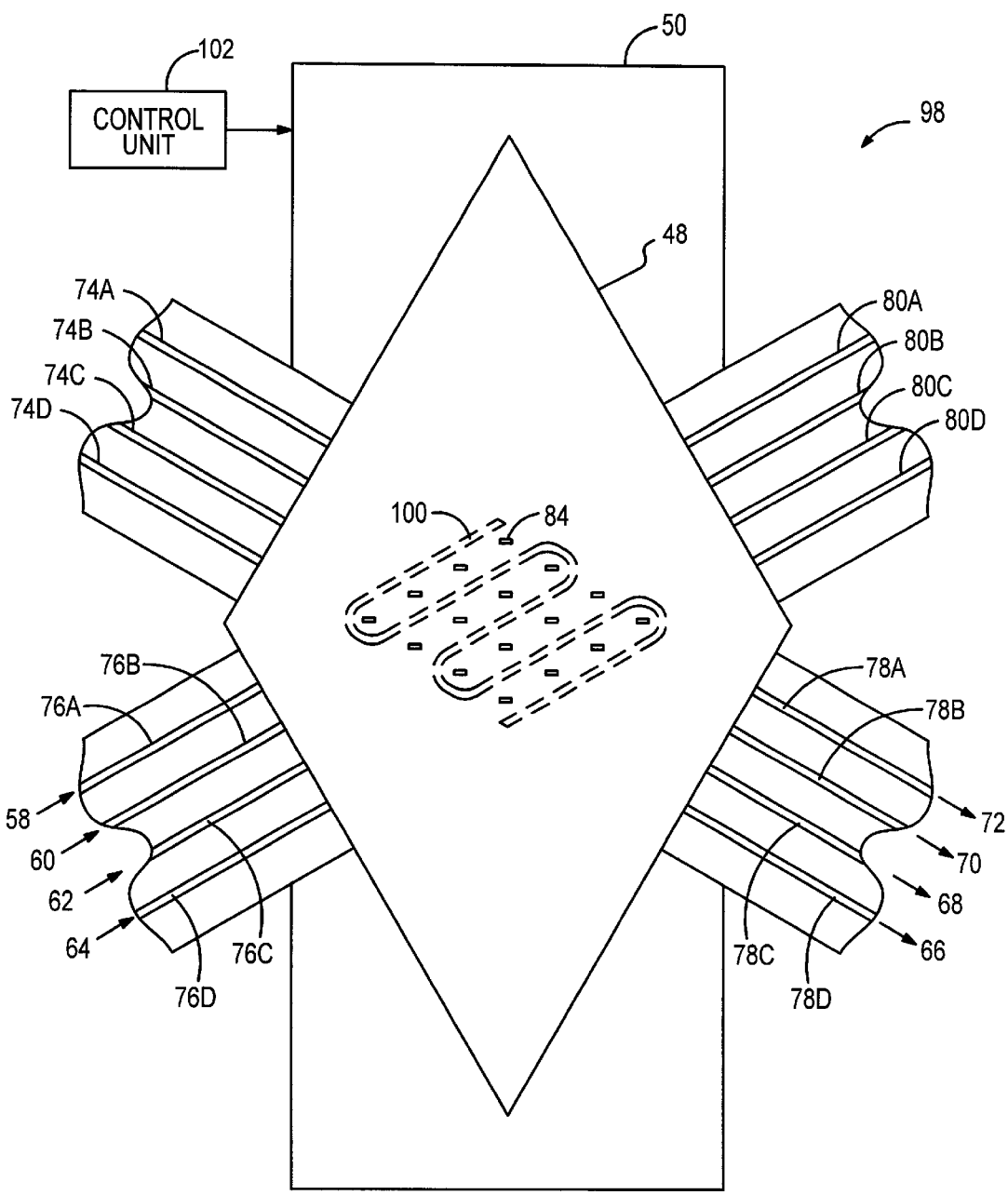
FIG. 6 is a top view of a thermally activated optical switch in accordance with a third embodiment of the invention.

With reference to FIG. 6, a thermally activated optical switch 98 in accordance with a third embodiment of the invention is shown. In this figure, the thermally activated optical switch 98 is illustrated with the waveguide chip 48 removed. Although not shown, the waveguide chip includes the waveguides, the intermediate waveguides, and the trenches described above. Also not illustrated is the fact that the heater chip includes the fluid fill-holes that connect the fluid reservoir in the metal substrate with trenches of the waveguide chip. However, these features of the optical switch 98 are identical to those of previous embodiments. The heater chip also includes the switching resistors 84. However, in this embodiment, the heater chip further includes a large serpentine compensating resistor 100. In a preferred design, the large compensating resistor is fabricated within the heater chip, below the surface on which the switching resistors are located. The material and shape of the compensating resistor can be chosen to generate a desired range of thermal energy and to spread as uniformly as possible the generated thermal energy throughout the heater chip. The compensating resistor and the switching resistors of the heater chip are electrically connected to a control unit 102. The control unit includes circuitry to selectively drive the switching resistors. In addition, the circuitry of the control unit is configured to selectively activate the compensating resistor with variable electrical power, which would depend on the required compensating thermal energy that is to be generated by the compensating resistor. The control unit may be an off-chip device that is connected to the heater chip by electrical leads. However, the control unit may be partially or completely fabricated on the heater chip.

In operation, X switching resistors 84 are selectively activated by the control unit 102 to create bubbles in the trenches that are aligned with the activated resistors, so as to achieve the current switching configuration of the optical switch 98. If X equal N, the thermal energy generated by the activated switching resistors is the desired total thermal energy. Thus, no compensating thermal energy needs to be generated. However, if X is less than N, the thermal energy generated by the activated resistors is less than the desired thermal energy. In this case, the control unit supplies the compensating resistor 100 with electrical power to generate a compensating thermal energy that equals the difference between the desired total thermal energy and the thermal energy generated by the activated switching resistors. As a result, the total thermal energy generated within the optical switch 98 is fixed, regardless of the switching configuration of the optical switch. As the thermal energy generated by the switching resistors changes for different switching configurations, the compensating resistor is driven by the control unit to generate a compensating thermal energy that will result in the desired total thermal energy. Therefore, the operating temperature of the optical switch 98 will remain consistent. The design of the compensating resistor may be chosen such that the total electrical power supplied to the switching resistors and/or the compensating resistor will always equal the power P times N, regardless of the switching configuration of the optical switch. In alternative arrangements, the optical switch 98 may include additional compensating resistors that are supplied with a variable electrical power to generate the desired compensating thermal energy.

Figure 7:
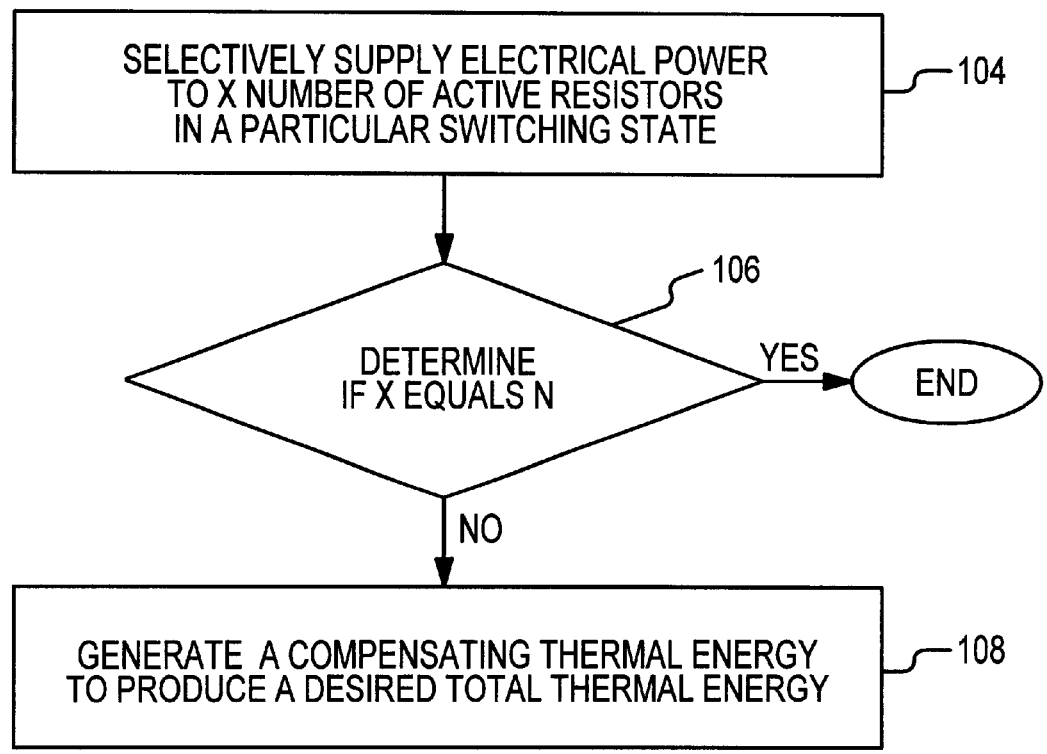
FIG. 7 is a flow diagram of a method of providing temperature control for a thermally activated optical switch in accordance with the invention.

A method of providing temperature control for an N×M thermally activated optical switch in accordance with the invention will be described with reference to a flow diagram of FIG. 7. During step 104, X number of switching resistors are selectively supplied with electrical power to configure the optical switch in a particular switching state, where $0 \leq X \leq N$. As a result, these switching resistors generate a switching thermal energy. The switching thermal energy depends on the number of switching resistors that are activated and the electrical power that is supplied to each switching resistor. In a preferred method, the switching resistors are supplied with a predefined amount of electrical power to generate bubbles within corresponding trenches in a waveguide chip of the optical switch. Thus, in this preferred method, the switching thermal energy would only depend on the number of switching resistors that are activated. Next, during step 106, it is determined whether X equals N. If X equals N, the method comes to an end. However, if X is less than N, the method proceeds to step 108. During step 108, a compensating thermal energy is generated to produce a desired total thermal energy, where the total thermal energy equals the sum of the switching thermal energy and the compensating thermal energy. Depending on the switching thermal energy, the compensating thermal energy is varied to produce the desired thermal energy, regardless of the current optical switching configuration of the optical switch. Since the total thermal energy remains fixed with different switching configurations, the operating temperature of the optical switch is maintained at a substantially consistent temperature.

In a first embodiment, the compensating thermal energy is generated by one or more compensating resistors. In this embodiment, the compensating resistors are structurally identical to the switching resistors. The compensating resistors are positioned to minimize any interference with the switching operation. Preferably, the compensating resistors are distributed throughout a heater chip of the optical switch, on which the switching and compensating resistors are formed. When X switching resistors are activated, N–X compensating resistors are activated to generate the compensating thermal energy, where N is the number of input optical paths of the optical switch. Thus, for any switching configuration of the optical switch, N resistors are activated. Consequently, the desired total thermal energy is generated for different switching configurations to maintain the optical switch at a substantially consistent operating temperature.

In a second embodiment, the compensating thermal energy is generated by all of the switching resistors along one or more columns of resistors that are not being used for optical switching, i.e., the input optical paths of the switch that are in the transmission mode. In this embodiment, for each column, an electrical power P is supplied to that column. The power P is the required electrical power for a switching resistor to generate a bubble within a corresponding trench. If that column is being used for optical switching, one of the switching resistors on that column is supplied with the power P, activating that switching resistor. However, if that column is not being used for optical switching, the power P is distributed to each switching resistor on that column. Thus, each switching resistor is supplied with electrical power equal to P/M. Since each of these switching resistors is supplied with power less than P, these resistors are not activated, i.e., they do not cause bubbles to be created within the corresponding trenches. As a result, the total thermal energy generated by the activated resistors and the resistors that are supplied with P/M power will be fixed for different optical switching configurations. Consequently, the optical switch will be maintained at a consistent operating temperature.

In a third embodiment, the compensating thermal energy is generated by a single large compensating resistor. In this embodiment, the single compensating resistor is supplied with a variable electrical power to generate a thermal energy that equals the difference between the desired total thermal energy and the switching thermal energy generated by the activated switching resistors. Thus, the desired total thermal energy can be generated for different switching configurations of the optical switch, which results in a consistent operating temperature.

What is claimed is:

1. A method of providing temperature control for a thermally activated switch having a plurality of heating elements comprising steps of:

selectively supplying electrical power to at least one heating element to configure said thermally activated switch in a switching configuration, said at least one heating element generating a switching thermal energy when supplied with said electrical power; and generating a compensating thermal energy by supplying said electrical power to at least one other heating element, said compensating thermal energy depending on said switching thermal energy to produce a substantially constant total thermal energy regardless of said switching configuration.

2. The method of claim 1 wherein said compensating thermal energy is a difference between said total thermal energy and said switching thermal energy.

3. The method of claim 1 wherein said step of supplying said electrical power to at least one other heating element includes a step of supplying a variable amount of electrical power to a compensating heating element to generate said compensating thermal energy, said variable amount of electrical power being dependent on said generated switching thermal energy.

4. The method of claim 1 wherein said step of selectively supplying said electrical power to at least one heating element includes a step of supplying each switching heating element with a predefined amount of electrical power, and wherein said step of supplying said electrical power to at least one other heating element includes a step of supplying each compensating heating element with said predefined amount of electrical power.

5. The method of claim 4 wherein said step of supplying each switching heating element is a step of supplying said electrical power to X switching heating elements, where X is an integer, and wherein said step of supplying each compensating heating element is a step of supplying said electrical power to N−X compensating heating elements, where N is greater than zero.

6. The method of claim 1 wherein said electrical power supplied to at least one heating element and to at least one other heating element is a fixed amount of electrical power.

7. The method of claim 1 wherein said step of supplying said electrical power to at least one other heating element includes a step of supplying said electrical power to selected heating elements such that each selected heating element is provided with an amount of electrical power less than a predefined amount of electrical power, said predefined amount of electrical being the amount required by each heating element to execute a switching function.

8. The method of claim 7 wherein said step of supplying said electrical power to said selected heating elements includes a step of distributing said predefined amount of electrical power to said heating elements that are operatively associated with a data path that is in a transmission mode.

9. A switching system comprising:
a waveguide substrate having a plurality of data paths defined by waveguides, each data path including a first waveguide and a second waveguide separated by a gap;
a heater substrate having a plurality of heating elements; and
a control circuitry operatively associated with said heating elements of said heater substrate to supply electrical power to said heating elements, said control circuitry being configured to selectively supply said electrical power to at least one heating element to achieve a desired switching configuration that results in a generation of a switching thermal energy, said control circuitry further being configured to selectively supply said electrical power to at least one other heating element to provide thermal compensation, when said switching thermal energy is below a target energy level to produce a substantially constant total thermal energy.

10. The system of claim 9 wherein said heater substrate includes a compensating heating element, and wherein said control circuitry is configured to supply said compensating heating element with a variable amount of electrical power, said compensating heating element being designed to generate a compensating thermal energy when supplied with said variable amount of electrical power to provide said thermal compensation.

11. The system of claim 10 wherein said compensating heating element and said control circuitry are configured to generate said compensating thermal energy in which said compensating thermal energy is a difference between said target energy level and said switching thermal energy.

12. The system of claim 10 wherein said compensating heating element is located below a surface of said heater substrate.

13. The system of claim 9 wherein said heater substrate includes a plurality of compensating heating elements, and wherein said control circuitry is configured to selectively supply said electrical power to a selected number of said compensating heating elements to generate a compensating thermal energy to provide said thermal compensation, said selected number being dependent on said thermal compensation required to achieve said target energy level.

14. The system of claim 13 wherein said heater substrate includes N×M switching heating elements and N compensating heating elements, where N and M are integers, and wherein said control circuitry is configured to supply said electrical power to X number of selected switching heating elements, where $0 \leq X \leq N$, and to Y number of selected compensating heating elements, where Y=N−X.

15. The system of claim 14 wherein said control circuitry is configured to supply a predefined amount of electrical power to each of said selected switching heating elements and said selected compensating heating elements, said predefined amount of electrical power being the electrical power required by a single switching heating element to execute a switching function.

16. The system of claim 9 wherein said heater substrate includes N×M switching heating elements, where N and M are integers, and wherein said control circuitry is configured to supply said electrical power to selected switching heating elements to generate a compensating thermal energy to provide said thermal compensation, each selected switching heating element being supplied with an amount of electrical power less than a predefined amount of electrical power required to execute a switching function.

17. The system of claim 16 wherein said control circuitry is configured to distribute said predefined amount of electrical energy to a column of said switching heating elements to generate said compensating thermal energy when none of said switching heating elements on said column are being activated to achieve said desired switching configuration.

18. A method of providing temperature control for a thermally activated switch having a plurality of heating elements comprising steps of:
activating at least one heating element to achieve a switching configuration, thereby generating a switching thermal energy; and
providing thermal compensation when said switching thermal energy is below a target energy level, said thermal compensation effectuating a substantially consistent operating temperature for said thermally activated switch.

19. The method of claim 18 wherein said step of providing said thermal compensation includes a step of supplying a variable amount of electrical power to a compensating heating element to generate a compensating thermal energy.

20. The method of claim 18 wherein said step of activating at least one heating element includes a step of activating X switching heating elements, where X is an integer, and wherein said step of providing said thermal compensation includes a step of supplying electrical power to N−X compensating heating elements to generate a compensating thermal energy, where N is greater than zero.

21. The method of claim 20 wherein each of said X switching heating elements and said N−X compensating heating elements is supplied with a predefined amount of electrical power such that the total electrical power supplied to said X switching heating elements and said N−X compensating heating elements remains substantially constant for different switching configurations, said predefined amount of electrical power being the amount required by each switching heating element to execute a switching function.

22. The method of claim 18 wherein said step of providing said thermal compensation includes a step of supplying electrical power to selected heating elements to generate a compensating thermal energy such that each selected heating element is provided with an amount of electrical power less than a predefined amount of electrical power, said predefined amount of electrical power being the amount required by each heating element to execute a switching function.

* * * * *